United States Patent
Dennison

(10) Patent No.: US 8,472,073 B2
(45) Date of Patent: Jun. 25, 2013

(54) VALIDATION OF A PRINT VERIFICATION SYSTEM

(75) Inventor: Carl Michael Dennison, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 2085 days.

(21) Appl. No.: 11/110,233

(22) Filed: Apr. 20, 2005

(65) Prior Publication Data

US 2006/0238780 A1    Oct. 26, 2006

(51) Int. Cl.
*G06F 15/00* (2006.01)
*G06K 9/00* (2006.01)

(52) U.S. Cl.
USPC ........... 358/1.9; 358/406; 358/1.14; 382/149; 356/237

(58) Field of Classification Search
USPC ......................................... 358/1.9, 1.14, 406
See application file for complete search history.

(56) References Cited

U.S. PATENT DOCUMENTS

| | | | |
|---|---|---|---|
| 5,187,376 A | 2/1993 | Hashimoto et al. | |
| 5,548,691 A | 8/1996 | Sato et al. | |
| 5,625,703 A | 4/1997 | Okuda et al. | |
| 5,761,336 A * | 6/1998 | Xu et al. | 382/141 |
| 5,898,491 A * | 4/1999 | Ishiguro et al. | 356/243.4 |
| 6,009,439 A * | 12/1999 | Shiomi et al. | 1/1 |
| 6,411,378 B1 * | 6/2002 | Pike | 356/237.5 |
| 6,504,625 B1 | 1/2003 | Amero et al. | |
| 6,589,860 B1 * | 7/2003 | Ang et al. | 438/613 |
| 6,665,425 B1 | 12/2003 | Sampath et al. | |
| 7,006,246 B1 * | 2/2006 | Nakajima | |
| 7,066,246 B2 * | 6/2006 | Pauchet et al. | 166/65.1 |
| 2003/0142985 A1 * | 7/2003 | Sampath et al. | 399/9 |
| 2003/0193684 A1 | 10/2003 | Kendall et al. | |

FOREIGN PATENT DOCUMENTS

JP    2000-172844    6/2000

* cited by examiner

*Primary Examiner* — Marivelisse Santiago Cordero
*Assistant Examiner* — Huo Long Chen
(74) *Attorney, Agent, or Firm* — Duft Bornsen & Fettig, LLP

(57) ABSTRACT

Methods, systems, and media are disclosed for testing the accuracy of a print verification system (PVS) in test mode, wherein a PVS is often used to validate the accuracy of printed output. One embodiment includes receiving, by an application, an output from a print verification system associated with the application, wherein the output comprises one or more defects. The embodiment also includes receiving, by the application, a list, such as a copy, of seeded defects for the output, wherein the list is uploaded to and saved by the application. In addition, the embodiment includes matching, by the application, the one or more seeded defects in the list that correspond to the one or more defects in the output. Finally, the embodiment includes displaying, by the application, results of the testing after the matching.

18 Claims, 3 Drawing Sheets

VALIDATION OF A PRINT VERIFICATION SYSTEM

FIELD OF INVENTION

The invention generally relates to print verification systems, and, in particular, to methods, systems, and media for testing print verification systems for accuracy.

BACKGROUND

Printer output, such as text on paper, normally occurs when a computer sends a digital file to a printing device, such as a printer, copier, facsimile, or the like. This digital file often contains information associated with and necessary for the printing device to print the output. Examples of this information include the number of copies, the type of paper to be used, the orientation for printing the output, and so forth. In order for the printing device to glean this information, and, therefore, correctly print the output, a processor associated with the printing device reads the received digital file.

Sometimes, however, after the printing device receives the digital file, the printing device fails to print the output in exact accordance with the digital file's instructions. As a result, printing errors occur in the output. For example, in the black-and-white context, the printing device may print black on the output where white should be, that is, "unintended black," and/or the printing device may not print black on the output where black should be, that is, "missing black." Additional examples of undesirable defects on the output include spots, lines, streaks, bleeding, haloing, tenting, trail-edge deletion and starvation. Regardless of the type of defect on the output, businesses either selling printing devices or heavily relying on the accuracy of printing devices may desire to validate the output accuracy of such printing devices.

Printing verification systems (PVSs), such as that offered by IBM, exist to validate the accuracy of printing devices. In short, a PVS is a printing inspection device which can inspect the whole surface of a printed matter in detail at high speed. More specifically, a typical PVS includes an associated high speed printer that prints about 300 sheets/minute, and the output from this printer is on a continuous form sent through an associated duplex scanner, i.e., two cameras, wherein each one scans an image of the opposing sides of the output. PVS then compares the scanned images to the printed images of the output, and determines whether the scanned images are the same as the printed images of the output. If the printing device under test by PVS is working properly, then the scanned images are the same as the printed images of the output. However, if differences exist, such as "unintended black" or "missing black" is found by the PVS analyzer module of PVS, then PVS will report that the printing device is producing defects in the output. Such defects will be reported on a display, such as on a graphical user interface (GUI), associated with PVS.

Despite the existence of PVS's to test for defects in a printing device's output, problems remain in determining whether printing devices are indeed working properly. If a PVS is malfunctioning, and, thereby, fails to report defects for a printing device when defects indeed exist, then the PVS is not serving its intended function. Reliance, therefore, by the industry on a malfunctioning PVS is entirely possible, which can lead to catastrophic and unpredictable consequences for businesses that heavily rely on the accuracy of its printing devices that they believe, albeit wrongly, are working properly. Unfortunately, no known measures, much less rapid, automated measures, exist for determining whether a PVS is analyzing a printing device's output properly.

A need, therefore, exists for automated methods, systems, and media for testing the accuracy of a PVS.

SUMMARY OF THE INVENTION

Embodiments of the invention generally provide methods, systems, and media for testing the accuracy of a print verification system. In one embodiment, the method for testing the accuracy of a print verification system generally includes receiving, by an application, an output from a print verification system associated with the application, wherein the output comprises one or more defects. The method also includes receiving, by the application, a list, such as a copy, of seeded defects for the output, wherein the list is uploaded to and saved by the application. In addition, the method includes matching, by the application, the one or more seeded defects in the list that correspond to the one or more defects in the output. Finally, the method includes displaying, by the application, results of the testing after the matching.

In another embodiment, the invention provides a system for testing the accuracy of a print verification system. The system generally includes a receiver module for receiving, by an application, an output from a print verification system associated with the application, wherein the output comprises one or more defects. The system also includes the receiver module receiving, by the application, a list, such as a copy, of seeded defects for the output, wherein the list is uploaded to and saved by the application. In addition, the system includes a matching module for matching, by the application, the one or more seeded defects in the list that correspond to the one or more defects in the output. Finally, the system includes a display module for displaying, by the application, results of the testing after execution by the matching. Module.

In yet another embodiment, the invention provides a machine-accessible medium containing instructions for testing the accuracy of a print verification system, which when executed by a machine, cause the machine to perform operations. The instructions generally include operations for receiving, by an application, an output from a print verification system associated with the application, wherein the output comprises one or more defects. The instructions further include operations for receiving, by the application, a list, such as a copy, of seeded defects for the output, wherein the list is uploaded to and saved by the application. Further still, the instructions include operations for matching, by the application, the one or more seeded defects in the list that correspond to the one or more defects in the output. Finally, the instructions further include operations for includes displaying, by the application, results of the testing after performing the instructions for matching.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE EMBODIMENTS

Figure 1:
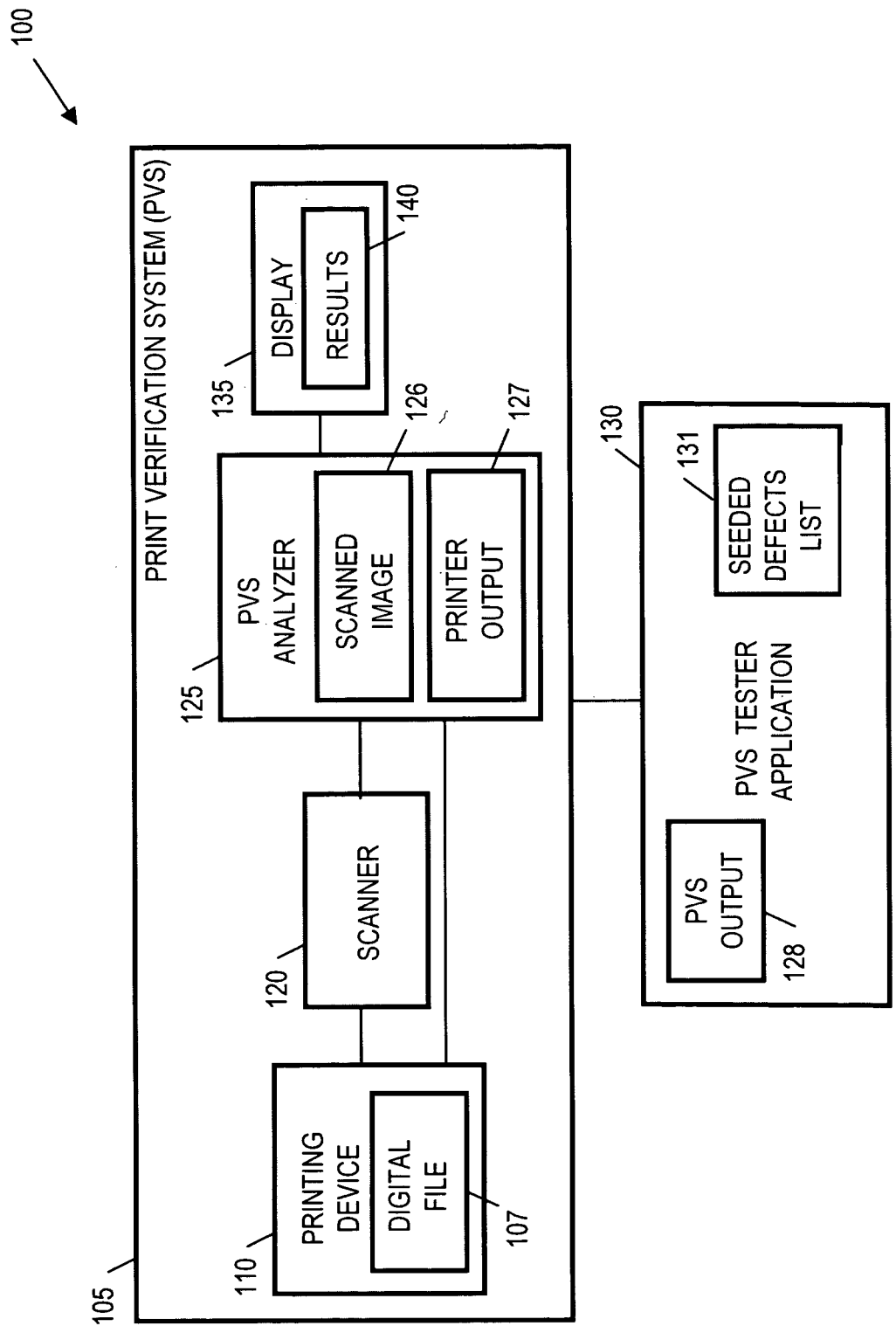
FIG. 1 depicts an example embodiment of an overview of a print verification system (PVS) and application used in accordance with the disclosed invention.

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for testing the accuracy of a print verification system (PVS) are contemplated. Embodiments include a PVS, which, generally, is understood to include a printing device, such as a printer, for receiving a digital file from a computer system either associated or integrated into the PVS for operation in either a test or a verify mode. The printing device processes the digital file by reading the packets of information in the digital file, which, for example, contains a first page and a second page, wherein the second page is the same as the first page except for the inclusion of seeded defects known to someone associated with the testing of the PVS. The printer prints the interpreted digital file as printer output, such as text on paper, and an associated scanner scans the printer output as an image, such as in bitmap format. With reference to the first and second pages just discussed, logic associated with the PVS analyzer of the PVS compares the first page of the printer output to a scanned version of the second page. In addition and optionally, the logic also has the PVS analyzer compare the second page of the printer output to a scanned version of the first page. Afterwards, the PVS produces the comparison's output on an associated display, such as a computer screen showing a graphical user interface for logging or listing the test results by the PVS. If the PVS is working properly, the comparison's output, or simply, "PVS output," should report any detected differences, i.e., seeded defects such as missing or unintended black ink, that truly exist between a comparison of the first and second pages.

This disclosure, however, relates to systems, methods, and media for testing the accuracy of a PVS in its test mode. That is, this disclosure validates that the PVS, in test mode, is testing properly by an application associated or integrated into the PVS. The application, also referred to as the PVS tester application in this disclosure, generally analyzes the PVS output from the PVS to determine whether the PVS in test mode is working properly. More specifically, the applications analyzes the PVS output to determine whether the PVS output reported all of the seeded defects that the PVS should have found by testing the first and second pages. If the application reports PVS found all of the defects that PVS was expected to find, then the PVS is working properly. Otherwise, PVS may not be working properly, and repair of the PVS may be necessary.

Turning now to FIG. 1, a general overview of a system 100 for testing the accuracy of a print verification system (PVS) 105, in accordance with the invention, is disclosed. The system 100 includes a printing device 110, likely used by testers of a PVS 105, wherein the printing device 110 receives a digital file 107 which, for example, contains a first page and a second page, wherein the second page is the same as the first page except for the inclusion of seeded defects known to someone associated with the testing of the PVS 105. The printing device 110, such as a printer, facsimile, and so forth, prints the interpreted digital file 107 as printer output 127, such as text on paper. In addition, an associated scanner 120 scans the printer output 127 as a scanned image 126, such as in bitmap format. The scanner 120, itself, may be a duplex scanner having two cameras, wherein one is on top and one is on the bottom, for producing a scanned image 126 of the printer output 127. Here, a duplex scanner may simultaneously scan both sides of a two-sided printer output 127, and, thereby, produce a scanned image of the first page and the second page in one pass of the scanner 120.

The PVS analyzer 125, through associated logic, compares a scanned image 126 of the first page to the printer output 127 of the second page. In addition and optionally, the PVS analyzer 125 also compares a scanned image 126 of the second page to the printer output 127 of the first page. Ideally, analysis of the first and optional second comparisons should yield results, which are termed "PVS output" in this disclosure, that show differences, i.e., seeded defects, gleaned by comparing the first and second pages. Notably, the first and optional comparisons of the first and second pages should produce the same, but reflective, defects. For example, say the PVS output 128 for the PVS analyzer's 125 comparison and analysis of a scanned image 126 of the first page to the printer output 127 of the second page is only unintended black seeded defects. Then, comparison and analysis of a scanned image 126 of the second page to the printer output 127 of the first page should be missing black seeded defects. By this example, it follows that the PVS output 128 reports the same defects, but are reflective relative to the page's side, i.e., first or second.

Associated with the PVS 105 is a PVS tester application 130, or simply, "application" 130, which by enabling logic reduced to code and/or hardware, obtains the PVS output 128 for further analysis. The application 130, itself, is either loaded on the computer system associated with the PVS 105 or integrated into the computer system associated with the PVS 105. The application 130 has an uploaded seeded defects list 131, which contains a list of the seeded defects, such as unintended black or missing black, which were placed on the above-discussed digital file's 107 second page. More specifically, the seeded defects list 131 is, for example, a list of seeded defects having known variables, such as type of defect, page number on which each type of defect is placed, the distances along and across the page on which the type of defect is placed, and the size of the type of defect.

The application 130, again, through enabling logic reduced to code and/or hardware, compares the PVS output 128 to the seeded defects list 131 to analyze whether the PVS analyzer 125 reported all of the seeded defects that the PVS analyzer 125 should have found if the PVS 105 is working properly. After this analysis by the application 130, the application 130 reports the results 140 for testing the accuracy of the PVS 105 on a display 135 either associated with the PVS 105, or, in the alternative, on a separate, non-depicted display solely associated with the application 130.

Figure 2:
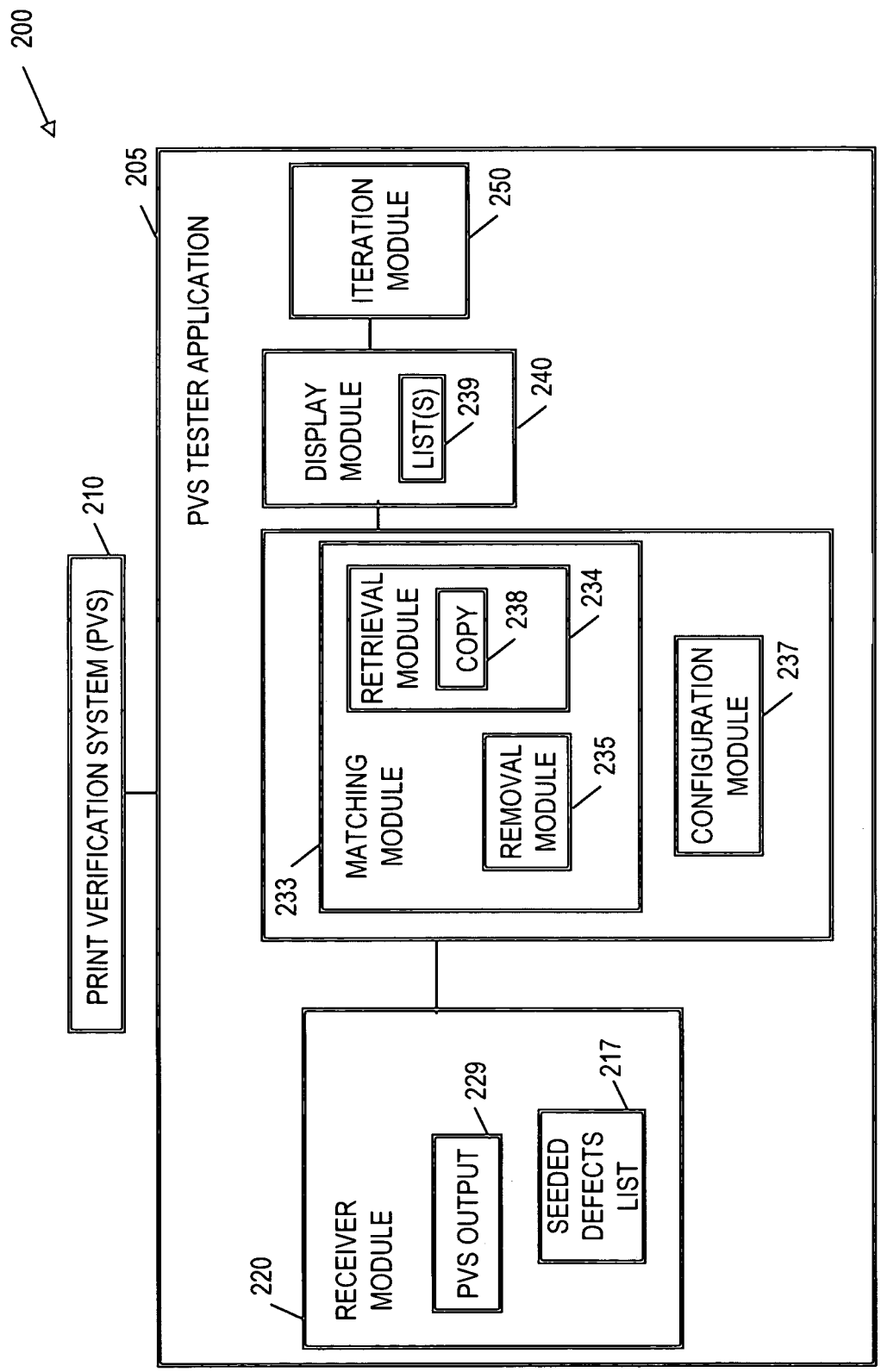
FIG. 2 depicts an example embodiment of a system for testing the accuracy of a PVS in accordance with the disclosed invention.

Now, moving to FIG. 2, a more detailed discussion of a system 200 for testing a print verification system (PVS) ensues. In particular, the discussion regarding system 200 depicted in FIG. 2 focuses on the application 205 that compares and analyzes the PVS output 229 from a PVS 210 in order to test the accuracy of the PVS 210.

As previously discussed and shown in FIG. 1, FIG. 2 also depicts a PVS 210, but components of the PVS 210 are not depicted in FIG. 1. Reference to FIG. 1 is appropriate, if necessary, to revisit the components of the PVS 210 in the following discussion of the application 205 depicted in FIG. 2. In addition, it is noteworthy to repeat that the application 205, itself, is located on a computer system associated with the PVS 210 or, in the alternative, is integrated into the computer system associated with the PVS 210.

The document under test by system 200 is the PVS output 229, which is based on a comparison and analysis of a document, for example, having the first and second pages previously discussed with reference to FIG. 1, wherein the second page is the same as the first page, but the second page also includes seeded defects. The defects 220, if any, reported in the PVS output are then analyzed by the application 205 to ensure that the PVS 210 is working properly.

To determine this query, enabling logic associated with the application's 205 receiver module 220 receives the PVS output 229 through communication, such as over a network, with the PVS 210. As just disclosed again, the PVS output 229 contains the results the PVS analyzer's comparing and analyzing for defects of, for example, a first page and a second page of a document under test by the PVS 210, wherein the second page differs from the first page only in that the second page also contains seeded defects. With the PVS output 229 received by the receiver module 225, further enabling logic, whether reduced to code and/or hardware, is associated with the receiver module 225, or, in the alternative, a separate module in communication with the receiver module 225, which allows for the uploading and saving of a seeded defects 217 list.

Before turning to more of the application's 205 functionality described in example embodiments by modules, it is worthwhile to expound on the seeded defect list 217. The seeded defects list 217 are the seeded defects placed, for example, on the above-discussed second page before the digital file including this second page is interpreted by the printer and scanner of the PVS 210. The seeded defects are defects having known variables to a tester, for instance. The seeded defect list 217, that is, a file or script, for example, contains various fields for each defect placed on a page, such as the above-discussed second page. One field is the type of defect, such as "missing black" or "unintended black" ink that is placed on one page but not on another page that is identical except for this defect. Of course, there any many different types of seeded defects possible for placing on a page and for ultimate analysis by the PVS analyzer and application 205, and, to that end, it is understood that "missing black" or "unintended black" ink are just examples of seeded defect types. Another field is the page number on which the seeded defect occurs. Two additional fields for seeded defects include the distance across the page where the seeded defect is located, and the distance along the page where the seeded defect is located. A final example field of a known variable for the seeded defects is the size, i.e., such as in pixels, of the seeded defect. Less or more, as well as different, fields for the seeded defects on the seeded defect list 217, are entirely possible and likely without departing from the scope of the invention. The above-fields are illustrative only, but they are also entirely adequate for enabling the application 205 to perform as intended.

Returning to the application's 205 functionality discussion, which is presented for explanation in modular format to ensure the functionalities of the application 205 are specifically addressed and disclosed, the receiver module 220, through enabling logic, communicates with the matching module 233 to attempt matching of the PVS output 229 to the seeded defects list 217. More specifically, the matching module 233 attempts to match by comparing and analyzing the PVS output's 229 reported defects to the seeded defects known by reference to the seeded defects list 217. Afterwards, and by further similarly enabling logic, the matching module 233 reports its matching analysis of the PVS output 229 with reference to the seeded defects list 217, where the matching analysis, for example, is in the form of one or more defects lists 239 for display, such as on a GUI on a computer screen, via a display module 240.

Through enabling logic associated with the matching module 233, an associated retrieval module 234 retrieves the PVS output 229, which includes defects found by PVS 210 for the document under test, from the receiver module 220. In addition, the retrieval module 234 also retrieves a copy 239 of the seeded defects list 217 from the receiver module 215. Before resorting to matching, another modular component of the matching module 233, namely the removal module 220, first engages in a whittling away process of seeded defects that could not be matches for any of the defects found by PVS 210 and reported in the PVS output 229.

The removal module 235 first removes seeded defects from the received copy 239 of the seeded defects list 217 for seeded defects that appear on pages of the document under test as determined by reference of which pages exist in the PVS output 229. At this juncture, it is prudent to take a brief departure from discussion of the removal module 235, and discuss the iteration module 250 of the application 205. For a document under test by PVS 210, typically, the associated high speed printer, which may print at 300 sheets/minute, does not scan each and every page of the document under test; that is, only part of the document is scanned as an image, wherein that part may be less than a page or multiple pages in length. The document, normally being a multi-page document, must be copied at least six or seven times at a minimum in order for PVS to eventually scan all parts of the document under test; that is, at a minimum, six or seven copies of the document under test are normally necessary, but not a hard-fast rule, in order for a random sampling to result in all parts of the document under test to be scanned; maybe sixty or seventy copies may be necessary to have PVS scan every page of a large document. As a result, the application 205 optionally includes an iteration module 250, which is enabled with logic to allow the matching module 230 to repeat its functional analyses for additional pages, with and without seeded defects, analyzed by the PVS analyzer, and yielded as PVS output 229, which is further analyzed by the application 205 as discussed herein.

Returning now to the removal module 235, and after seeded defects from the copy 238 of the seeded defects list 217 are removed that were not part of defects in the PVS output, the removal module 235 proceeds in its analysis. The removal module 235 removes seeded defects from the copy 238 of the seeded defect list 217 for any seeded defects that do not appear on part, e.g., a page, of the PVS output 229 when such seeded defect(s) should. The removal module 235 passes these "undetected seeded defects" to an associated display module 240, which has enabling logic to report these "undetected seeded defects," for example, as a list 239 on a GUI on a display associated solely with the application 205 or, in the alternative, on a display associated with PVS 210 as depicted in FIG. 1.

The removal module 235 then proceeds to further analyze the copy 238 and the PVS output's 229 defects. The removal module 235 determines whether the PVS output's 229 defects are on a page number that is greater than the highest numbered page having a seeded defect. If yes, then these one or more defects in the PVS output 229 are passed as "unexpected defects" to an associated display module 240, in the same manner, as just discussed, for display as a list 239 or otherwise.

Next, the removal module 235, in combination with the matching module 233, attempts to match the remaining seeded defects in the copy 238 of the seeded defects list to the defects 229 of the PVS output through the known variables associated with the seeded defects and the defects. That is, for example, the matching occurs by page, type, and location of the defects as compared to seeded defects, wherein the defects are reported to the receiver module 220 with the known variables of page, type, and location before being ultimately passed to the removal module 235. To assist in this matching, the configuration module 237 is a component of the matching module 230 that affects matching determinations by the application 205. The configuration module 237 includes enabling logic to allow the tester, administrator, operator, or whomever else having access rights, to set thresholds used for matching seeded defects to defects in the PVS output 229. One example threshold for setting includes the distance any of the defects are from a particular seeded defect in order for the one of the defects to be considered a match to the particular seeded defect in the copy 238. For each match of a seeded defect in the copy 238 to a defect in the PVS output 229, the matched seeded defect is removed from the copy 238 of the seeded defects list 217. For those remaining defects that do not match any of the seeded defects remaining in the copy 238 of the seeded defects 217, then these "unexpected defects" are passed to the display module 240 for display as previously discussed.

Finally, for each remaining seeded defects in the copy 238 of the seeded defects list 217, the removal module 230 receives the PVS 210 minimum detectable size setting, from, for instance, communicating with the configuration module 237, which has the minimum detectable size setting threshold denoted for PVS 210 during the determination of the defects by PVS 210. As an alternative, the removal module 230 may have enabling logic to receive, directly from PVS 210, the minimum detectable size setting threshold used during the determination of the defects by PVS 210. Regardless how the removal module 235 receives the PVS 210 minimum detectable size setting, which is often a variable setting based on pixel size, the removal module 235 removes seeded defects from the copy 238 of the seeded defects list 217 for any seeded defects not found because such seeded defects were smaller than the minimum detectable size. The removal module 235 then passes such too small seeded defects to the display module 240, for display, as previously described, to be "seeded defects too small for detection." Thereafter, the removal module 235 passes all other seeded defects remaining in the copy 238 of the seeded defects list 217 to the display module 240, for display, as "seeded defects not found." At this point, the automated system 200 for testing whether PVS is working properly can now be determined by simply looking at the display. In sum, if PVS is working perfectly correctly, then the copy 238 of the seeded defects list 217 will equal zero, and, any deviations from zero will be displayed on a GUI, log, or similar report, such as a lit 239, on a display associated with the application 205.

Figure 3:
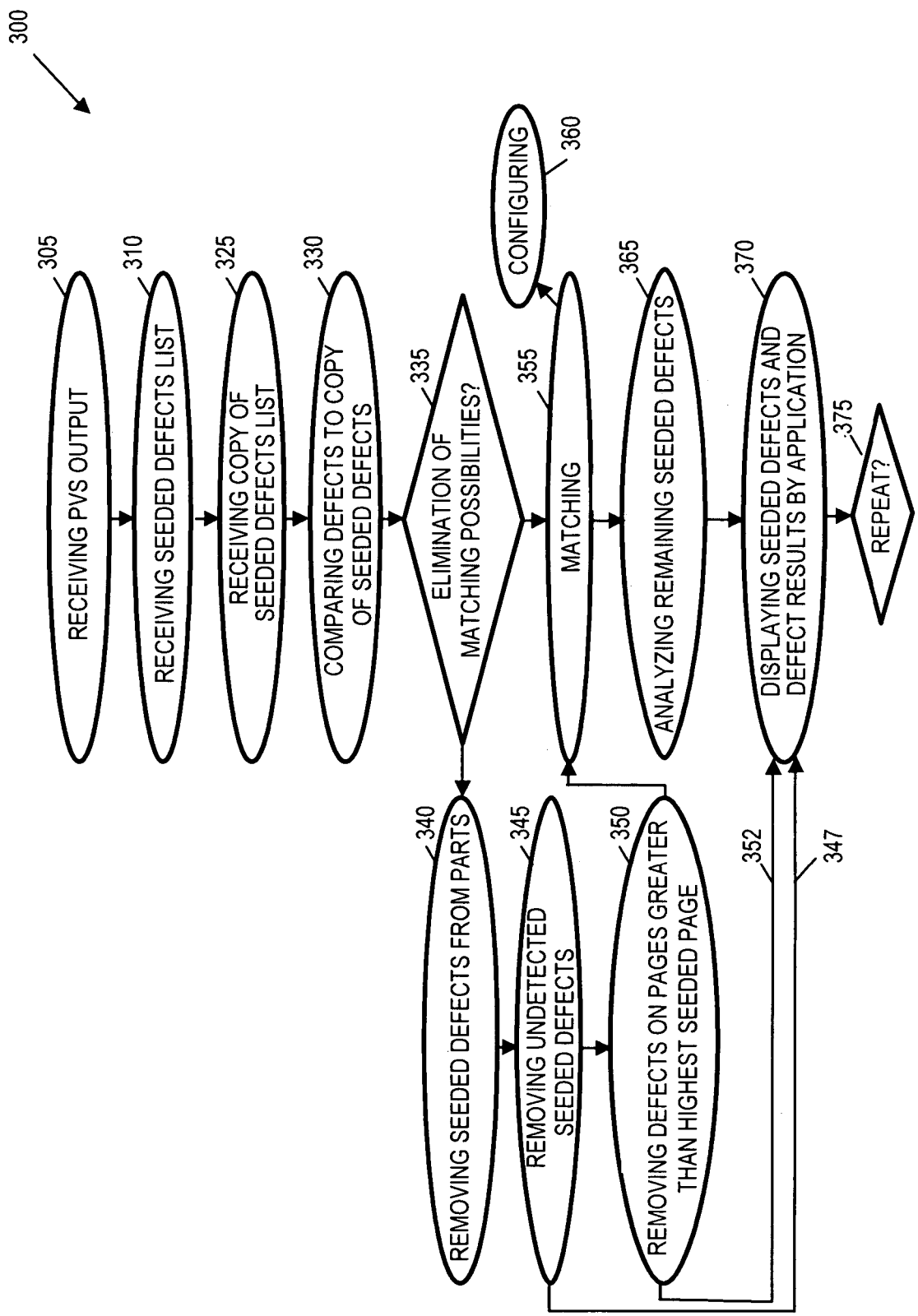
FIG. 3 depicts an example embodiment of a flowchart for testing the accuracy of a PVS in accordance with the disclosed invention

Turning now to FIG. 3, another aspect of the invention is disclosed. In particular, an embodiment of a flowchart 300 for testing the accuracy of a print verification system (PVS). Flowchart 300 is for a system, such as systems 100 and 200, as shown in FIG. 1 and FIG. 2. In general, the flowchart 300 depicts example embodiments of automated methods for testing the accuracy of PVS.

Flowchart 300 begins by an application, which is associated with or integrated into a PVS, having enabling logic to provide the application with the capability to receive 305 defects in PVS output after analysis by the PVS of a document under test, e.g., a first page and a second page, wherein the second page differs from the first only in that the second page also includes seeded defects. After the application receives 305 the PVS output, further enabling logic, found in code and/or hardware and associated with the application, receives 310 a seeded defects list, which is likely a master list or an updateable list that contains all the seeded defects placed in the seeded defect part, e.g., above-described second page, of the document under test. These seeded defects, themselves, come from a previously uploaded file, such as a list, to the application.

The flowchart 300 continues by the application receiving 325 a copy of the seeded defects list from the application. After the application's logic receives the defects in the PVS output by calling, for example, within the application, further logic associated with the application enables comparing 330, which is aimed at matching 355, these defects to a copy of a list of the seeded defects associated with the application. Before delving into wholesale comparing 330 of the defects to the copy of the list of seeded defects, the application has enabling logic to being whittling away, that is, elimination 335 of matching possibilities for defects to those existing in a copy of the seeded defect list. Elimination 335 of matching possibilities, depicted as a decision block in FIG. 3, enables quicker processing of ultimate attempts to match defects to the copy of the seeded defects, and, this is especially true as any or all of the following increase: the number of defects, number of seeded defects, and size of the scanned images under comparison. If the decision is "yes," that is, to try and eliminate 335 matching possibilities, then the application's elimination logic presents a systematic approach to reduce seeded defects from the copy of the seeded defects list that could not possibly match any of the defects in the PVS output, as well as to quickly categorize defects that could not possibly match any of the seeded defects. At the end of this elimination analysis, matching 355 by the application occurs from a subset of the remaining seeded defects on the copy of the seeded defects list and a subset of the defects, and, automated matching 355 attempts between these subsets reduces the processor time and usage needed to attempt matching 355 any of the remaining defects in the two subsets.

The application's associated and enabling logic first removes 340 seeded defects from the copy of the seeded defects list for seeded defects that are not on parts of the document not included in the parts of the document tested for defects. With the copy of the seeded defects list now likely reduced, the application's logic now removes seeded defects from the copy of the seeded defects list for parts, such as a page, on which no defect was found. That is, if no defect was found on a part of the document under test as known by looking at the PVS output, and one or more seeded defects were indeed placed on that part of the image, then, these seeded defects are removed from the copy of the list of seeded defects. Through further associated logic, the application sends 347 these "undetected seeded defects" for displaying 370 on a display, such as a GUI, list, or log, appearing, for example, on a computer screen or monitor associated solely with the application, or, in the alternative, with the application and the PVS.

Already with the possible elimination of some seeded defects from a copy of the list of seeded defects, attempts at matching 355 the remaining defects and seeded defects is easier. However, further elimination logic associated with the application next determines whether any of the defects appear on pages numbers that are greater than the highest page number having a seeded defect. If yes, then the application's logic removes these defects from the possibility for later matching 355 by sending 352 these "unexpected defects" for displaying 370, as previously discussed.

The flowchart 300 continues now by attempting to match 355 the defects and seeded defects in the copy of the seeded defects that remain. Since the defects and the copy of the seeded defects list have fields of known variables such as page, type, location, as well as size of seeded defect, wherein some of these known variables were used in the above-discussed elimination analysis, attempts at matching 355 may occur based on these known variables. Prior to matching 355, however, the application is optionally configured 360 to set threshold limits for matching 355. By configuring 360, the tester, or other proper authority, sets thresholds for what the application will determine is an acceptable match between a particular seeded defect on the list and a particular defect. For instance, one threshold setting is the acceptable distance between a particular defect and a particular seeded defect in order for there to be a match by the application. Logic associated with the application sends the seeded defects that match defects for displaying 370, as previously discussed, and, for example, such may appear as a list of "matching seeded defects." In addition, for the remaining unmatched defects, the application's logic also sends these "unmatched defects" for displaying 370, as previously discussed.

Moving towards culmination of the flowchart 300, and after attempting to match 355, the seeded defects remaining in the copy of the seeded defects list are analyzed 365 by the application. The application's logic, in optional example embodiments, directly communicates with PVS or retrieves from the application's configuration threshold settings the PVS minimum detectible size for defects. For instance, if the minimum detectable size for PVS to detect a defect is 8×8 pixels, then if any of the remaining seeded defects appearing in the copy of seeded defects list is less than 8×8 pixels in size, then these seeded defects are removed from the copy of the seeded defects list, and associated logic in the application sends such "seeded defects too small for detection" for displaying 370. For any seeded defects now remaining on the copy of the seeded defects list, then enabling logic in the application now sends these remaining seeded defects, if any, for displaying 370 as "seeded defects not found."

The flowchart 300 ends by querying with a repeat 375 decision block, a query directed at ensuring all parts of the document are analyzed by the application. As previously mentioned, typically, PVS only scans one in seven parts of the document under test, and, therefore, multiple iterations of the automated method depicted by the flowchart 300 are necessary to ensure that all parts of the document for testing are analyzed by the PVS, and, ultimately by the application.

Another embodiment of the invention is implemented as a program product for use with a computer system such as, for example, the systems 100 and 200 shown in FIG. 1 and FIG. 2. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A method for testing accuracy of a print verification system, the method comprising:
generating, by an application, a list of seeded defects, wherein one or more of the seeded defects in the list are used in at least part of a document forming a basis of testing of the print verification system;
receiving, by the application, an output from the print verification system associated with the application, wherein the output comprises one or more actual defects;
receiving, by the application, the list of seeded defects for the output;
matching, by the application, the one or more seeded defects to corresponding said one or more actual defects in the output to test the accuracy of the print verification system based on a threshold;
adjusting the threshold;
removing seeded print defects in the list that correspond to detected actual print defects in the output;
repeating said receiving the list of seeded print defects for processing undetected print defects, receiving the output for processing the undetected print defects, and matching actual print defects to the list of seeded print defects; and
displaying, by the application, results of the testing after said repeating.

2. The method of claim 1, further comprising repeating the testing to ensure the testing of every part of the document.

3. The method of claim 1, wherein the matching comprises matching based on comparison of known variables for the seeded defects in the list and the actual defects in the output.

4. The method of claim 1, wherein the matching comprises matching any of the seeded defects in the list to any of the actual defects in the output based on at least one threshold setting.

5. The method of claim 1, wherein the displaying comprises displaying the results in the form of one or more lists.

6. The method of claim 1, wherein matching comprises, by the application, comparing the one or more seeded defects in the list to the one or more actual defects in the output to determine undetected defects by the print verification system.

7. A test system for testing accuracy of a print verification system, the test system comprising:
- a receiver module for receiving, by an application, an output from the print verification system in communication with the application, wherein the output comprises one or more actual defects, the receiver module of the application being operable for receiving a list of seeded defects for the output, wherein one or more of the seeded defects in the list are used in at least part of a document forming a basis of testing of the print verification system;
- a matching module, associated with the receiver module, for matching the one or more seeded defects to corresponding said one or more actual defects in the output to test the accuracy of the print verification system based on a threshold;
- a display module, associated with the application, for displaying results of the testing after execution by the matching module; and
- a processor operable to implement at least one of the receiver module, the matching module, and the display module, wherein the processor is further operable to:
- generate the list of seeded defects;
- direct the matching module to adjust the threshold;
- direct the matching module to remove seeded print defects in the list that correspond to detected actual print defects in the output; and
- direct the modules to repeat receiving the list of seeded print defects for processing undetected print defects, receiving the output for processing the undetected print defects, and matching actual print defects to the list of seeded print defects.

8. The test system of claim 7, further comprising an iteration module for repeating the testing to ensure the testing of every part of the document.

9. The test system of claim 7, wherein the matching module comprises matching based on known variables for the actual defects in the output and the seeded defects in the list.

10. The test system of claim 7, wherein the matching module comprises a configuration module for configuring threshold settings used by the matching module for matching any of the seeded defects in the list to any of the defects in the output.

11. The test system of claim 7, wherein the display module comprises displaying the results in the form of one or more lists on a display associated with the application.

12. The test system of claim 7, wherein the matching module is further operable to compare the one or more seeded defects in the list to the one or more actual defects in the output to determine undetected defects by the print verification system.

13. A non transitory machine-accessible medium containing instructions, which when executed by a machine, cause the machine to perform operations for testing accuracy of a print verification system, comprising:
- generating, by an application, a list of seeded defects, wherein one or more of the seeded defects are used in at least part of a document forming a basis of testing of the print verification system;
- receiving, by an application, an output from the print verification system associated with the application, wherein the output comprises one or more actual defects;
- receiving, by the application, the list of seeded defects for the output;
- matching, by the application, the one or more seeded defects to corresponding said one or more actual defects in the output to test the accuracy of the print verification system based on a threshold;
- adjusting the threshold;
- removing seeded print defects in the list that correspond to detected actual print defects in the output;
- repeating said receiving the list of seeded print defects for processing undetected print defects, receiving the output for processing the undetected print defects, and matching actual print defects to the list of seeded print defects; and
- displaying, by the application, results of the testing after said repeating.

14. The non transitory machine-accessible medium of claim 13, wherein the instructions further comprise operations for repeating the testing to ensure the testing of every part of the document.

15. The non transitory machine-accessible medium of claim 13, wherein the instructions for matching comprise instructions for performing operations for matching based on comparison of known variables for the seeded defects in the list and the one or more actual defects in the output.

16. The non transitory machine-accessible medium of claim 13, wherein the instructions for matching comprise instructions for performing operations for matching any of the seeded defects in the list to any of the defects based on at least one threshold setting.

17. The non transitory machine-accessible medium of claim 13, wherein matching comprises, by the application, comparing the one or more seeded defects in the list to the one or more actual defects in the output to determine undetected defects by the print verification system.

18. A computer program embodied on a non transitory tangible computer readable medium comprising instructions that, when executed by a processor, are operable to direct the processor to test accuracy of a print verification system by:
- processing a list of seeded print defects to print an output with one or more actual print defects corresponding to one or more seeded print defects in the list;
- processing the output to detect the actual print defects;
- comparing the detected actual print defects in the output to the list of seeded print defects to determine a number of undetected print defects in the output; and
- processing the undetected print defects in the output to determine the accuracy of the print verification system and to display results of the accuracy testing;
- wherein the instructions are further operable to direct the processor to:
- compare the seeded print defects in the list to the actual print defects in the output based on a threshold;
- adjust the threshold;
- remove seeded print defects in the list that correspond to the detected actual print defects in the output; and
- repeat said processing the list of seeded print defects, processing the output, comparing the detected actual print defects, and processing the undetected print defects.

* * * * *